United States Patent [19]

Yamamoto et al.

[11] Patent Number: 5,029,021

[45] Date of Patent: Jul. 2, 1991

[54] VIDEO RECORDING/REPRODUCING APPARATUS AND METHOD OF EDITING VIDEO TAPE

[75] Inventors: Norihiro Yamamoto; Shigeo Kizu, both of Yokohama, Japan

[73] Assignee: Kabushiki Kaisha Toshiba, Kawasaki, Japan

[21] Appl. No.: 213,224

[22] Filed: Jun. 29, 1988

[30] Foreign Application Priority Data

Jun. 30, 1987 [JP] Japan ............................. 62-163066

[51] Int. Cl.$^5$ ........................................... H04N 5/782
[52] U.S. Cl. ................................. 360/14.1; 360/26; 360/36.2
[58] Field of Search ................. 360/14.1, 14.3, 26, 360/36.1, 36.2; 358/311, 320, 337

[56] References Cited

U.S. PATENT DOCUMENTS

| | | |
|---|---|---|
| 3,939,490 | 2/1976 | Opelt . |
| 4,280,149 | 7/1981 | Bragas . |
| 4,389,680 | 6/1983 | Gramling ............................ 360/14.1 |
| 4,507,691 | 3/1985 | Ishiguro et al. .................... 360/14.3 |
| 4,706,135 | 11/1987 | Kojima ............................... 360/14.1 |
| 4,819,087 | 4/1989 | Takeuchi et al. ................... 360/14.3 |

FOREIGN PATENT DOCUMENTS

| | | |
|---|---|---|
| 55-163965 | 12/1980 | Japan ................................. 360/14.1 |
| 56-74878 | 6/1981 | Japan ................................. 360/14.1 |
| 56-74879 | 6/1981 | Japan ................................. 360/14.1 |
| 62-119782 | 6/1987 | Japan . |

OTHER PUBLICATIONS

Recording and Reproduction of an Image, pp. 286 and 287, Minoru Inazu (transliterated) et al.

Primary Examiner—Roy N. Envall, Jr.
Assistant Examiner—W. R. Young
Attorney, Agent, or Firm—Oblon, Spivak, McClelland, Maier & Neustadt

[57] ABSTRACT

A video recording/reproducing apparatus comprises a variable delay circuit for delaying an input video signal which is to be newly recorded on a recording medium and a delay controller for controlling a delay provided by this variable delay circuit. At the time of edit, the delay controller controls the delay so that the phase of a video signal reproduced from a position immediately before an edit entrance point of the recording medium coincides with the phase of an input video signal delayed by the delay circuit.

11 Claims, 3 Drawing Sheets

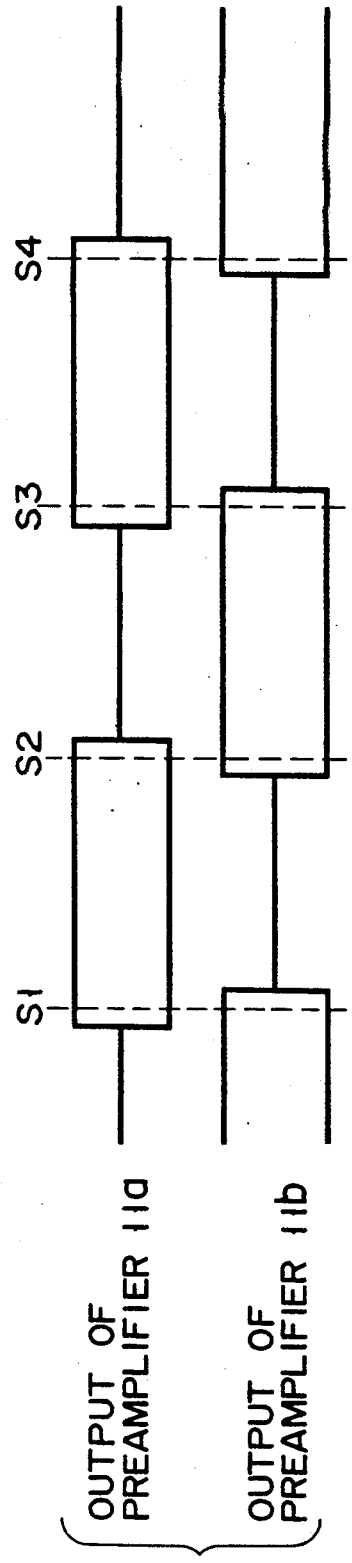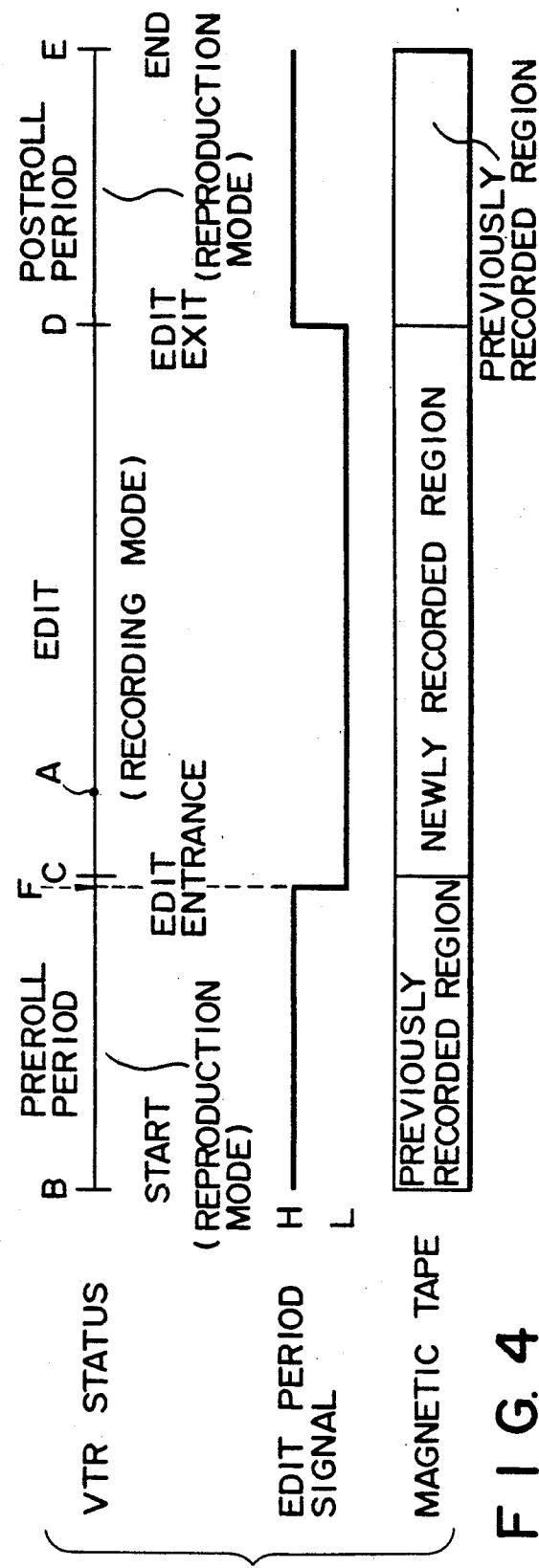

VIDEO RECORDING/REPRODUCING APPARATUS AND METHOD OF EDITING VIDEO TAPE

BACKGROUND OF THE INVENTION

1. Field of the Invention

The present invention relates to a video recording-/reproducing apparatus for recording and reproducing a video signal, and, more particularly, to a video recording/reproducing apparatus for use in electronic edit.

2. Description of the Related Art

In producing a work or program using a video recording/reproducing apparatus, it is likely that data recorded on a recording medium by this apparatus is properly edited to complete the work or program. Particularly, with the above video recording/reproducing apparatus for professional use, e.g., for preparing broadcasting, commercial and educational works or programs, edit is one of the essential processes. In present video recording/reproducing apparatuses for professional use today, it is typical to use a rotary head type video tape recorder (VTR) for effecting data recording-/reproducing on a magnetic tape as a recording medium by a rotary video head, and most of the apparatuses have an editing function.

In a video tape recorder, an editing operation, called Electronic Edit, is generally performed. In principle, the electronic edit is carried out by erasing portions of video and audio signals, which have already been recorded on a magnetic tape, part of the way and then recording new video and audio signals on the erased region on the magnetic tape.

In result of such edit, discontinuity of a signal occurs mainly around the edit entrance point. Particularly, discontinuity of the phase of a video signal causes disturbance on a video display screen and significantly deteriorates the quality of a video image.

To reduce the phase discontinuity of a video signal occurring on a magnetic tape in edit, conventional video tape recorders with an editing function for professional use generally utilize the following two methods.

(a) In initiating the edit, the rotational phase of a video head drum is compared with the sync signal of an input video signal that is to be newly recorded and the rotation of the video head drum is servo-controlled in such a way that the drum rotates in synchronization the sync signal of the input video signal.

(b) The magnetic tape having video signals already recorded thereon is reproduced from the position before the edit entrance point, the vertical sync signal in a reproduced video signal acquired in this reproduction period (called a preroll period) is compared with the vertical sync signal in the input video signal, and the rotational phase of the video head drum is servocontrolled in such a way that both of the vertical sync signals are synchronized with each other and the phases of these vertical sync signals coincide with each other.

The first method (a) is influenced by a mechanical mounting error of a tach pulse generator, which detects the rotational phase of the video head drum and generates a tach pulse in accordance with the detected rotational phase, with respect to the mounting position of the video head in the drum. In other words, with the magnetic tape being previously recorded by another video recording/reproducing apparatus, the phase of the video signal already recorded on the tape cannot accurately be coincident with the phase of a newly-input video signal, so that a significant phase discontinuity is more likely to occur in edit. As a solution to this problem, a tach phase controller (e.g., trimmer) for controlling the phase of a tach pulse indicating the rotational phase is normally adjusted for each edit to compensate for the mounting error so that the phase discontinuity of the video signal around the edit entrance point does not result in a large disturbance on the display screen.

As the second method (b) compares the phase of a video signal reproduced from a previously-recorded magnetic tape directly with that of an input video signal and controls the rotational phase of the video head drum based on the comparison result, the phase discontinuity of the video signal occurring in the edit is improved as compared with the method (a).

However, either method involves servo-control of the rotational phase of the head drum and thus has the control response speed and response accuracy limited.

According to the editing technique in conventional video recording/reproducing apparatuses, therefore, due to the limitation of the response speed and response accuracy of the servo control, it is difficult to always attain a good phase continuity of a video signal at the time of edit.

SUMMARY OF THE INVENTION

It is an object of this invention to provide a video recording/reproducing apparatus and method of editing video tape which easily provides the phase continuity of a video signal around an edit entrance point at the time of edit.

A video recording/reproducing apparatus embodying this invention comprises a variable delay circuit for delaying an input video signal to be newly recorded on a recording medium and a delay controller for controlling the delay caused by the variable delay circuit, and controls the delay at the time of edit so that the phase of a video signal reproduced at the position immediately before the edit entrance point on the recording medium coincide with the phase of an input video signal delayed by the variable delay circuit.

It is typical to use a semiconductor memory as the variable delay circuit. With the use of a semiconductor memory for the variable delay circuit, at the time of edit, the delay controller controls the delay by controlling the memory write timing in accordance with a sync signal in the input video signal and controlling the memory read timing in accordance with a sync signal in a video signal reproduced at the position immediately before the edit entrance point on the recording medium.

According to the video recording/reproducing apparatus of this invention, by controlling the delay in the variable delay circuit that delays an input video signal, the phase of a video signal previously recording on a recording medium and located immediately before the edit entrance point instantaneously coincide with the phase of an input (newly recorded) video signal outputted from the variable delay circuit. Therefore, a good phase continuity of a video signal around the edit entrance point can be attained without troublesome manual phase adjustment. This can always provide a satisfied editing result without the troublesome adjustment, which are conventionally required.

BRIEF DESCRIPTION OF THE DRAWINGS

FIG. 3 is a timing chart of the outputs of two preamplifiers used in reproduction, for explaining the operation of the apparatus of FIG. 1; and FIG. 4 is a timing chart for explaining the operation of the apparatus of FIG. 1 at the time of edit.

DETAILED DESCRIPTION OF THE PREFERRED EMBODIMENT

Figure 1:
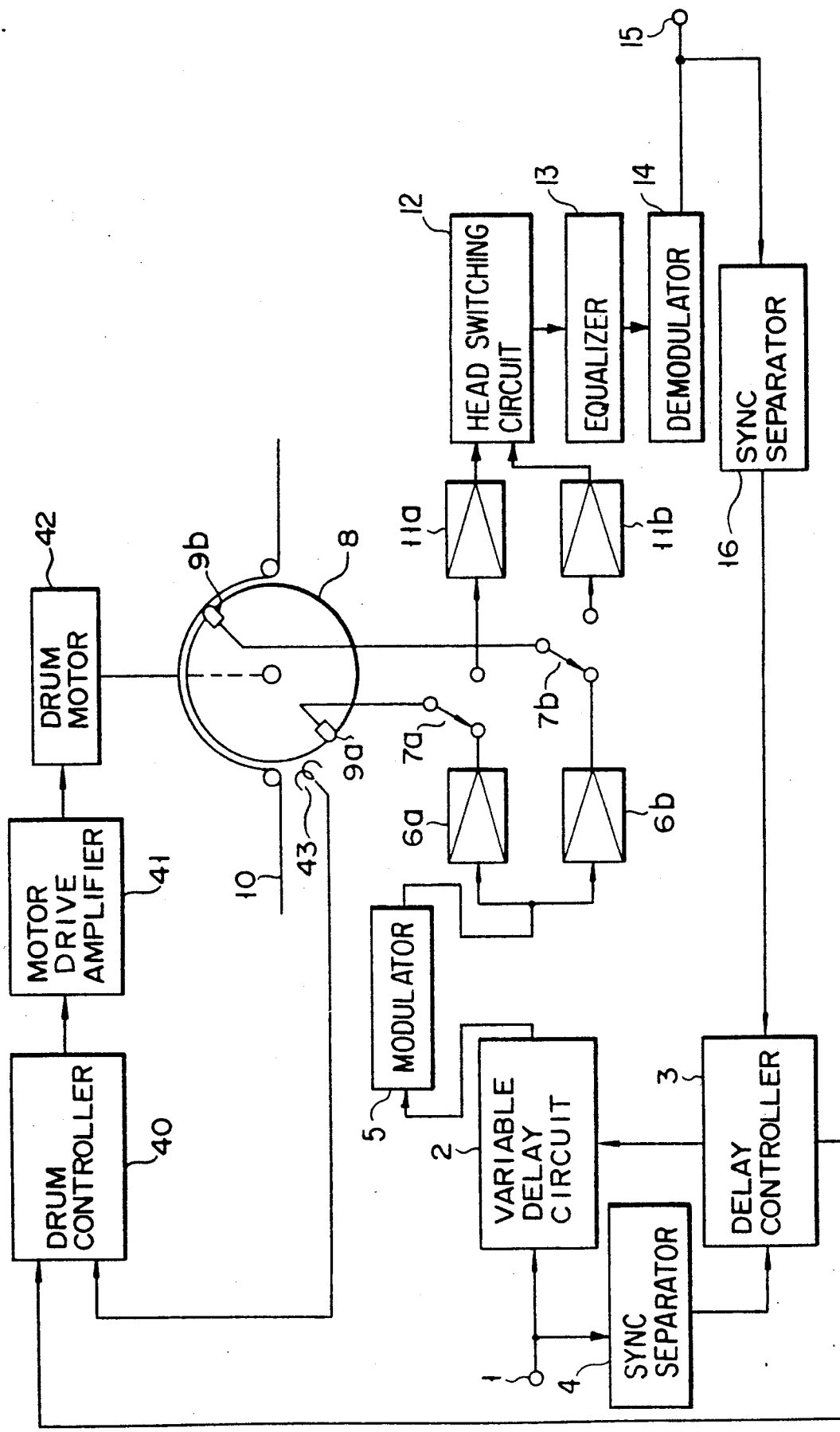
FIG. 1 is a block diagram of a video recording/reproducing apparatus according to one embodiment of this invention.

FIG. 1 illustrates the structure of a video recording/reproducing apparatus according to one embodiment of this invention, actually only that part of the apparatus assembled in a video tape recorder which is concerned with edit of a video signal. According to this embodiment, this invention is applied to a helical scan type video tape recorder, in which a magnetic tape as a recording medium is wound around a rotary head drum by an angular range slightly wider than 180° and recording and reproduction of a frequency-modulated video signal is executed by recording/reproducing heads located on the head drum at opposite relative positions of 180°.

The apparatus shown in FIG. 1 comprises a variable delay circuit 2, a delay controller 3, sync separators 4 and 16, a modulator 5, recording amplifiers 6a and 6b, switches 7a and 7b, a head drum 8, video heads 9a and 9b, preamplifiers 11a and 11b, a head switching circuit 12, an equalizer 13, a demodulator 14, a drum controller 40, a motor drive amplifier 41, a drum motor 42 and a tach pulse generator 43.

An input video signal to be recorded is applied to an input terminal 1. This input video signal is supplied to variable delay circuit 2 as well as sync separator 4, which separates a sync signal from the video signal. The sync signal separated in sync separator 4 is supplied to delay controller 3 that controls the delay in variable delay circuit 2. A detailed description of variable delay circuit 2 and delay controller 3 will be given later.

The input video signal delayed in variable delay circuit 2 is subjected to frequency modulation (FM) by FM modulator (i.e., frequency modulator) 5 to be an FM signal suitable for magnetic recording and this FM signal is then supplied to two recording amplifiers 6a and 6b. The outputs of these amplifiers 6a and 6b are respectively supplied through switches 7a and 7b and a rotary transformer (not shown) to recording/reproducing video heads 9a and 9b provided on head drum 8. Head drum 8 is driven by drum motor 42, and recording/reproducing video heads 9a and 9b record the FM signals coming from switches 7a and 7b onto magnetic tape 10.

The video signals recorded on magnetic tape 10, after reproduction by video heads 9a and 9b, are supplied through the rotary transformer and switches 7a and 7b to preamplifiers 11a and 11b, respectively. The output of preamplifiers 11a and 11b are supplied to head switching circuit 12. As shown in FIG. 3, the outputs of preamplifiers 11a and 11b are intermittent signals acquired only during nearly half rotation of head drum 8, so that head switching circuit 12 performs the switching operation at the timings shown by S1-S4 in FIG. 3 to alternately and selectively extract reproduced signals from preamplifiers 11a and 11b, and combines the extracted signals to provide a continuous reproduced signal.

The output of head switching circuit 12 is supplied to equalizer 13 where its frequency characteristic is compensated. The output of equalizer 13 is demodulated by demodulator 14 which detects an FM signal and is sent to an output terminal 15 as a video signal. The video signal from demodulator 14 is also supplied to delay controller 3 through sync separator 16.

Drum controller 40 controls drum motor 42 through motor drive amplifier 41. Tach pulse generator 43 generates a drum tack pulse synchronized with the rotation of head drum 8. This tach pulse represents the rotational phase of head drum 8. Drum controller 40 compares a reference sync signal (e.g., frame sync signal) from delay controller 3 with the tach pulse from tach pulse generator 43 and controls drum motor 42 so as to make these sync signals coincide with each other.

Figure 2:
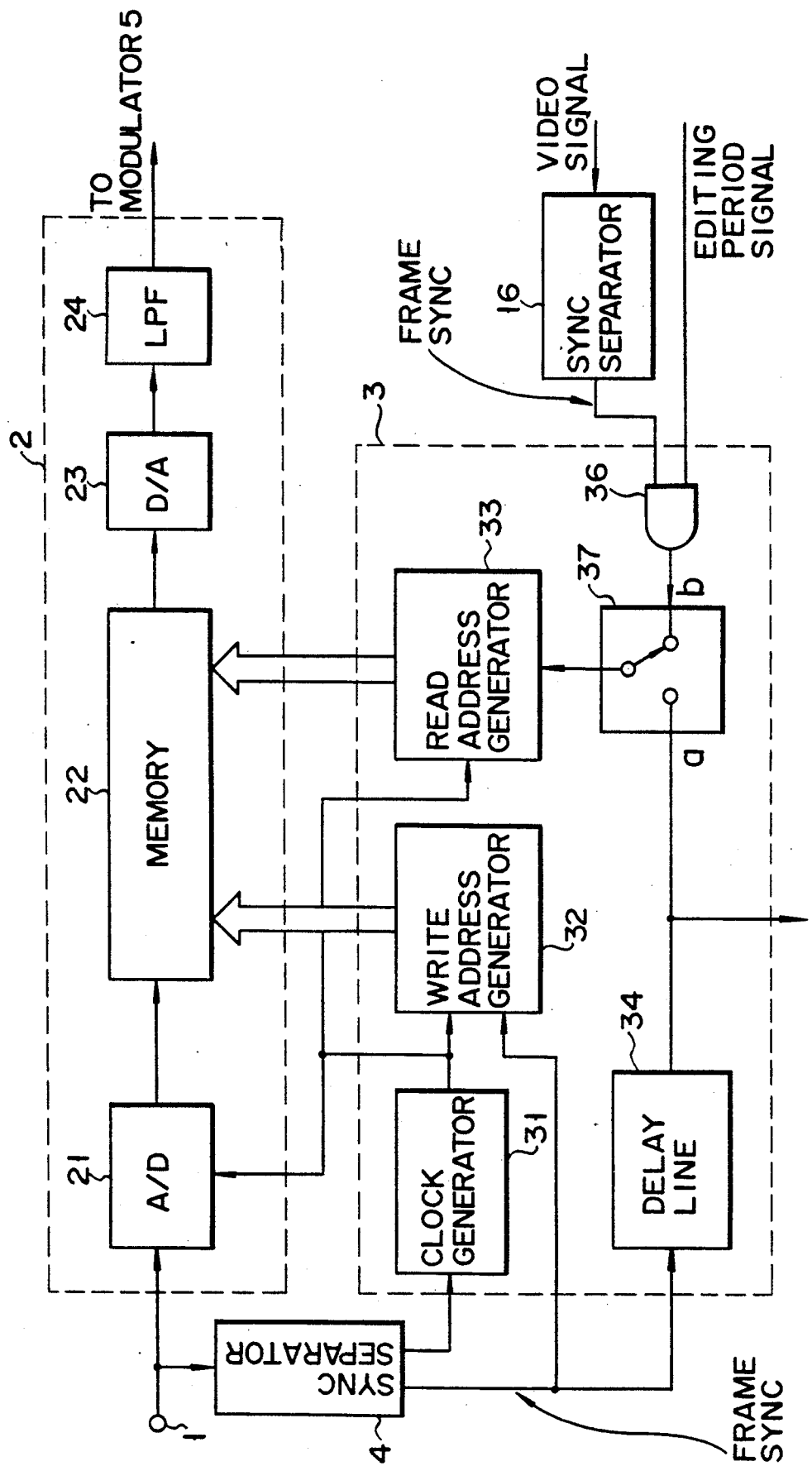
FIG. 2 is a block diagram illustrating the structure of part of the apparatus shown in FIG. 1.

FIG. 2 illustrates the detailed structures of variable delay circuit 2 and delay controller 3.

Variable delay circuit 2 has an A/D (analog-to-digital) converter 21, a memory 22, a D/A (digital-to-analog) converter 23 and a low-pass filter 24.

The input video signal is converted into a digital signal by A/D converter 21 and is then written in semiconductor memory (RAM (random access memory)) 22 having a memory capacity of, for example 5 H (H: horizontal scan period). A signal read out from memory 22 is converted into an analog signal by D/A converter 23, is smoothed by low-pass filter 24 and is outputted to modulator 5. In this case, a delay is the time difference between the data writing and reading of memory 22.

Delay controller 3 has a clock generator 31, a write address generator 32, a read address generator 33, a delay line 34, a gate circuit 36 and a switch circuit 37.

Write address generator 32 and read address generator 33 respectively generate addresses for data writing and reading of memory 22.

Clock generator 31 generates a clock synchronized with a line sync signal (horizontal sync signal) separated the input video signal by sync separator 4. This clock is supplied as a sampling clock to A/D converter 21 and is also supplied to write address generator 32 and read address generator 33.

Delay line 34 delays the frame sync signal separated from the input video signal by sync separator 4, by the time corresponding to, for example, 2.5 H. Gate circuit 36 outputs the frame sync signal separated from a reproduced video signal by sync separator 16 when an edit period signal which is supplied from an edit operation control section (not shown) goes high at the time of edit mode. Switch circuit 37 selectively switches between the output of delay line 34 and the output of gate circuit 36. The output of delay line 34 is also supplied to drum controller 40 for controlling drum motor 42.

Read address generator 33 is supplied with the output of switch circuit 37 as a reset signal, while write address generator 32 is supplied with the frame sync signal from sync separator 4 as a reset signal. These address generators 32 and 33 start functioning upon reception of their respective reset signals, and initialize the write and read addresses of memory 22 and thereafter sequentially increment the addresses.

Memory 22 has a memory capacity of 5 H as mentioned earlier, and address generators 32 and 33 have a machine cycle of 5 H. Therefore, the input video signal is repeatedly written and updated for every 5 H and is sequentially read out in the order written.

The operation of this apparatus will now be explained.

FIG. 4 illustrates the status of magnetic tape 10 and the video tape recorder at the time of insert edit. Assume that edit entrance point C and edit exit point D are set by the value of a tape timer and an edit command is given with video heads 9a and 9b stopped at position A. Then, magnetic tape 10 is rewound by a tape length corresponding to a predetermined reproduction period (o preroll period) before edit entrance point C and position B reaches the position of video head 9a or 9b. The video tape recorder temporarily stops with position B of magnetic tape 10 reaching the position of video head 9a or 9b and becomes a reproduction mode, and magnetic tape 10 moves at a specified speed and reaches edit entrance point C while video head 9a or 9b reproducing a video signal recorded on the tape 10.

When edit entrance point C of magnetic tape 10 reaches the position of video head 9a or 9b, the video tape recorder changes to a recording mode from the reproduction mode and starts recording a new video signal. When edit exit point D of magnetic tape 10 reaches the position of video head 9a or 9b, the video tape recorder returns to the reproduction mode from the recording mode and reproduces a video signal during a predetermined reproduction period (called a postroll period). When position E reaches to the position of video head 9a or 9b and magnetic tape 10 stops, the editing operation is completed.

Such an editing operation is repeated a plural number of times as needed.

In a mode other than the edit mode, switch circuit 37 is coupled to contact a. The read address of memory 22 is generated by read address generator 33 based on the clock and the signal which is the frame sync signal of the input video signal delayed by 2.5 H by delay line 34. This means that the video signal read out from memory 22 always has a delay of 2.5 H with respect to the input video signal.

When the video tape recorder is in the edit mode, switch circuit 37 is coupled to contact b. When the video tape recorder in this state becomes the reproducing mode, the sync signal supplied to read address generator 33 changes the frame sync signal separated from the reproduced video signal by sync separator 16. This frame sync signal is supplied to gate circuit 36 when the edit period signal is at a high level. This edit period signal becomes a low level at edit entrance point C and becomes a high level again at edit exit point D, as shown in FIG. 4.

In this edit mode, therefore, when the video tape recorder becomes the reproduction mode during the preroll period, a signal read out from memory 22 varies in accordance the phase of the reproduced video signal. Although this apparatus is designed in such a way that the phase of the reproduced video signal is delayed approximately by the delay (2.5 H) of delay line 34, the phase may be varied in a range of ±2.5 H.

When point F (immediately before edit entrance point C, as shown in FIG. 4) of magnetic tape 10 reaches the position of video head 9a or 9b, the edit period signal becomes low so that the reproduction frame sync signal separated by sync separator 16 is stopped at gate circuit 36. Consequently, the signal read out from memory 22 retains the phase of the reproduced video signal immediately before edit entrance point C.

The signal read out from memory 22 in the above state is converted into an analog signal by D/A converter 23' and is supplied to low-pass filter 24 to be an input signal of modulator 5 shown in FIG. 1, and this signal, after passing through head-changeover switches 7a and 7b and the rotary transformer, is recorded on magnetic tape 10 at a region between edit entrance point C and edit exit point D. The insert edit is carried out in this manner.

According to the present apparatus, since the phase of a video signal newly recorded at the time of edit coincides with the phase of a reproduced video signal immediately before the edit entrance point, phase discontinuity around the edit entrance point on a magnetic tape does not occur. Accordingly, the magnetic tape edited by this apparatus does not cause an image disturbance around the edit entrance point at the time of edit.

Although variable delay circuit 2 is realized by a digital delay line constituted by a semiconductor memory in the above embodiment, it may be realized by an analog delay line constituted by, for example, a CCD (charge coupled device) or a BBD (bucket brigade device).

Although the above embodiment has been explained with reference to the case in which phase continuity of a video signal around the edit entrance point is attained, phase continuity of the video signal around the edit exit point may be provided by also utilizing the delay control by the variable delay circuit.

In addition, the above embodiment is not limited to the case of insert edit; for example, this invention can of course apply to a so-called assemble edit.

This invention can be modified in various manners without departing from the scope of the invention.

What is claimed is:

1. A video recording/reproducing apparatus, comprising:
   means for determining a desired edit entrance point position on a recording medium on which a first video signal is recorded;
   means for erasing, from the recording medium, that portion of the first video signal recorded from the desired entrance point position onward and for recording an externally-input second video signal on the recording medium from the desired entrance point position onward;
   means for reproducing that portion of the first video signal which is recorded at locations preceding the desired entrance point position, the reproduced first video signal being used for phase adjustment of the second video signal to be recorded from the desired entrance point position onward;
   variable delay means, capable of adjusting a delay time, for delaying the second video signal; and
   delay control means for controlling the variable delay means such that the second video signal delayed by the variable delay means has a phase coinciding with that of the reproduced first video signal.

2. A video recording/reproducing apparatus according to claim 1, wherein said variable delay means includes memory means for temporarily storing said second video signal; and
   said delay control means includes readout timing control means for controlling a readout timing of said memory means based on a sync signal included in said reproduced first video signal reproduced from said position immediately before said edit entrance point at a time of edit, and write timing control means for controlling a write timing at which said input video signal is written in said memory means.

3. A video recording/reproducing apparatus according to claim 2, wherein said write timing control means includes means for controlling writing of said input video signal into said memory means based on a sync signal included in said second video signal.

4. A video recording/reproducing apparatus according to claim 2, wherein said memory means includes analog-to-digital conversion means for converting said second video signal into digital data, a digital memory for storing said digital data, and digital-to-analog conversion means for converting digital data read out from said digital memory into an analog signal.

5. A video recording/reproducing apparatus according to claim 2, wherein said memory means includes analog memory means for storing said second video signal.

6. A rotary head type video recording/reproducing apparatus having a rotatable head drum with a recording/reproducing head mounted thereon, comprising:
   means for determining a desired edit entrance point position on a magnetic tape on which a first video signal is recorded;
   means for erasing, from the magnetic tape, that portion of the first video signal recorded from the desired entrance point position onward and for recording an externally-input second video signal on the magnetic tape from the desired entrance point position onward;
   means for reproducing that portion of the first video signal which is recorded at locations preceding the desired entrance point position, the reproduced first video signal being used for phase adjustment of the second video signal to be recorded from the desired entrance point position onward;
   variable delay means, capable of adjusting a delay time, for delaying the second video signal; and
   delay control means for controlling the variable delay means such that the second video signal delayed by the variable delay means has a phase coinciding with that of the reproduced first video signal.

7. A video recording/reproducing apparatus according to claim 6, wherein said variable delay means includes memory means for temporarily storing said second video signal; and
   said delay control means includes readout timing control means for controlling a readout timing of said memory means based on a sync signal included in said reproduced first video signal reproduced from said position immediately before said edit entrance point at a time of edit, and write timing control means for controlling a write timing at which said input video signal is written into said memory means.

8. A video recording/reproducing apparatus according to claim 7, wherein said write timing control means includes means for controlling the writing of said input video signal into said memory means based on a sync signal included in said second video signal.

9. A video recording/reproducing apparatus according to claim 7, wherein said memory means includes analog-to-digital conversion means for converting said second video signal into digital data, a digital memory for storing said digital data and digital-to-analog conversion means for converting digital data read out from said digital memory into an analog signal.

10. A video recording/reproducing apparatus according to claim 7, wherein said memory means includes analog memory means for storing said second video signal.

11. A video recording/reproducing apparatus according to claim 6, further comprising means for controlling the rotation of said head drum based on a sync signal included in said second video signal.

* * * * *